(12) United States Patent
Wang (10) Patent No.: US 10,107,576 B2
(45) Date of Patent: Oct. 23, 2018

(54) HEAT EXCHANGER

(71) Applicant: FUJITSU GENERAL LIMITED, Kanagawa (JP)

(72) Inventor: Kaijian Wang, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 0 days.

(21) Appl. No.: 15/758,489

(22) PCT Filed: Aug. 19, 2016

(86) PCT No.: PCT/JP2016/074186
§ 371 (c)(1),
(2) Date: Mar. 8, 2018

(87) PCT Pub. No.: WO2017/043285
PCT Pub. Date: Mar. 16, 2017

(65) Prior Publication Data
US 2018/0252486 A1  Sep. 6, 2018

(30) Foreign Application Priority Data
Sep. 9, 2015 (JP) .................... 2015-177799

(51) Int. Cl.
*F28F 27/02* (2006.01)
*F28D 9/00* (2006.01)
*F28F 3/08* (2006.01)

(52) U.S. Cl.
CPC ............ *F28F 27/02* (2013.01); *F28D 9/0037* (2013.01); *F28F 3/086* (2013.01); *F28F 2250/04* (2013.01); *F28F 2260/02* (2013.01)

(58) Field of Classification Search
CPC ........ F28F 27/02; F28F 3/086; F28F 2250/04; F28F 2260/06; F28D 9/0037
(Continued)

(56) References Cited

U.S. PATENT DOCUMENTS 5,397,179 A * 3/1995 Berlin ................... B01F 5/0646
138/38
9,689,620 B2 * 6/2017 Yamada ................ F28D 9/0006
(Continued)

FOREIGN PATENT DOCUMENTS

| JP | S53-076874 A | 7/1978 |
|----|---|---|
| JP | S59-171823 A | 9/1984 |

(Continued)

OTHER PUBLICATIONS

Nov. 8, 2016, International Search Report issued for related PCT application No. PCT/JP2016/074186.

*Primary Examiner* — Claire Rojohn, III
(74) *Attorney, Agent, or Firm* — Paratus Law Group, PLLC (57) ABSTRACT

In order to correctly measure a temperature of a working fluid flowing through an outlet/inlet of a heat exchanger body, a flow adjustment ring is disposed within at least either one of a high-temperature inlet pipe and a low-temperature inlet pipe of the heat exchanger body. In this manner, a core region in which velocity and temperature of the working fluid becomes approximately constant is formed on a downstream side of the flow adjustment ring. A temperature sensor is provided in such a manner that a sensing point is arranged in this core region.

2 Claims, 10 Drawing Sheets

(58) Field of Classification Search
USPC .......................................................... 165/298
See application file for complete search history.

(56) References Cited

U.S. PATENT DOCUMENTS

| | | | |
|---|---|---|---|
| 10,018,427 B2 * | 7/2018 | Lin ......................... | F28D 15/04 |
| 2003/0062149 A1 * | 4/2003 | Goodson ............... | F04B 19/006 |
| | | | 165/104.11 |
| 2004/0184237 A1 * | 9/2004 | Chang .................... | F28F 13/12 |
| | | | 361/699 |
| 2004/0250994 A1 * | 12/2004 | Chordia .............. | F28D 15/0266 |
| | | | 165/80.4 |
| 2014/0090818 A1 * | 4/2014 | Rosenfeld ................ | F28F 3/12 |
| | | | 165/109.1 |

FOREIGN PATENT DOCUMENTS

| JP | S63-139535 U | 9/1988 |
|---|---|---|
| JP | H08-297040 A | 11/1996 |
| JP | 2000-121175 A | 4/2000 |
| JP | 2007-187353 A | 7/2007 |
| JP | 2009-127966 A | 6/2009 |

\* cited by examiner

HEAT EXCHANGER

CROSS REFERENCE TO PRIOR APPLICATION

This application is a National Stage Patent Application of PCT International Patent Application No. PCT/JP2016/074186 (filed on Aug. 19, 2016) under 35 U.S.C. § 371, which claims priority to Japanese Patent Application No. 2015-177799 (filed on Sep. 9, 2015), which are all hereby incorporated by reference in their entirety.

TECHNICAL FIELD

The present invention relates to a heat exchanger or a microchannel heat exchanger in which channels of working fluids for heat exchange are formed.

BACKGROUND ART

A heat exchanger is used as one element of a refrigeration cycle. The heat exchanger is an essential part for changing a temperature of a working fluid in the refrigeration cycle to a desired temperature. Various heat exchangers exist. In particular, microchannel heat exchangers have excellent performance, which is becoming more and more known. The microchannel heat exchangers are being developed for practical application.

Those microchannel heat exchangers include a stacked microchannel heat exchanger. This stacked microchannel heat exchanger is configured as follows, for example. A stack is formed by alternately stacking heat transfer plates having surfaces in which minute high-temperature channels are formed and heat transfer plates having surfaces in which minute low-temperature channels are formed. Metal plates for protection are disposed on an upper surface and a bottom surface of the stack, and pressed and heated in a vacuum state. In this manner, the heat transfer plates and the metal plates are diffusion-welded and integrated with one another (e.g., Non-Patent Literature 1).

Structural characteristics of the stacked microchannel heat exchanger as compared to a plate-type heat exchanger can include capability of forming a larger number of channels in each layer, capability of forming short channels, and the like. With this, the stacked microchannel heat exchanger can be downsized in comparison with the plate-type heat exchanger.

Further, the stacked microchannel heat exchanger has more excellent points also in performance in comparison with conventional heat exchangers, for example, better heat transfer property, smaller coolant filling amount, higher pressure-resistance, and higher heat-resistance. For example, the coefficient of overall heat transmission between working fluids via a heat transfer wall (plate) is large, the channel shape loss is low, the channel area can be reduced if the flow loss is equal to that of the plate-type heat exchanger, the pressure loss of compressed working fluids can be reduced, the amount of working fluid filling the refrigeration cycle can be reduced due to the reduced volume of the entire heat exchanger, etc.

The outlet and inlet of the stacked microchannel heat exchanger which working fluids exits and enters are provided with temperature sensors. The temperature sensors are provided for the purpose of calculating a quantity of heat exchanged in the heat exchanger on the basis of temperatures measured by the temperature sensors and controlling a flowing-out working fluid to a desired temperature.

For accomplishing this purpose, the temperature sensors need to be capable of correctly measuring temperatures of working fluids. For example, in a case where heat is exchanged between two working fluids, the heat exchange capability (amount of heat transferred) of the heat exchanger can be calculated on the basis of a temperature difference between a flowing-in working fluid and a flowing-out working fluid in accordance with the following expression.

$$Q([J/s] = [W])$$
$$= c_{p,l}([J/kgK]) \times G_l([kg/s]) \times (T_{Low,out} - T_{Low,in})([K])$$
$$= c_{p,h}([J/kgK]) \times G_h([kg/s]) \times (T_{High,in} - T_{High,out})([K])$$

Q: amount of heat transferred [J/s]=[W]

$c_{p,\ l}$: specific heat [J/kgK] of low-temperature working fluid $c_{p,\ h}$: specific heat [J/kgK] of high-temperature working fluid $G_l$: mass flow rate [kg/s] of low-temperature working fluid $G_h$: mass flow rate [kg/s] of high-temperature working fluid $(T_{Low,\ out}-T_{Low,\ in})$:(temperature difference [K] between heat-exchanger outlet temperature of low-temperature working fluid and inlet temperature of low-temperature working fluid)

$(T_{High,\ in}-T_{High,\ out})$:(temperature difference [K] between heat-exchanger inlet temperature of high-temperature working fluid and outlet temperature of low-temperature working fluid)

Further, with a water heater or the like, it is necessary to correctly measure a temperature of a working fluid flowing through an outlet of a microchannel heat exchanger for checking whether or not the working fluid has reached a desired temperature. Further, it is necessary to correctly measure a temperature of the working fluid flowing through an inlet of the microchannel heat exchanger for checking whether or not it is necessary to heat a working fluid flowing out of a hot water tank and also for deriving a quantity of heat required for heating the working fluid to a desired temperature.

For measuring the temperatures of the working fluids flowing through the outlet and inlet of the stacked microchannel heat exchanger, temperature sensors such as thermocouples are used. Thermoelectromotive force measured at a sensing point of each temperature sensor is transmitted to a thermoelectromotive force-to-temperature conversion circuit via a thermocouple wire continuous with the sensing point. In many cases, the temperature sensor is fixed to an outer surface of a pipe, which is attached to each of the inlet and the outlet for the working fluid of the heat exchanger, by soldering. In this case, the sensing point of the temperature sensor is not in direct contact with the working fluid, and hence it is impossible to correctly measure the temperature of the working fluid.

Therefore, the measured temperature has an error 1 due to heat conduction of the metal forming the heat exchanger, an error 2 due to a temperature difference between a temperature of a position at which the temperature sensor is attached and an actual temperature of the working fluid flowing through the outlet/inlet, an error 3 due to a temperature difference between a temperature of the working fluid flowing near a center of the pipe and a temperature of the working fluid flowing near a wall surface of the pipe due to a temperature boundary layer of the working fluid flowing through outlet/inlet pipe connected to the outlet/inlet, a measurement error 4 of a measurement method of the temperature sensor, and the like.

CITATION LIST

Non-Patent Literature

Non-Patent Literature 1: Japan Society of Mechanical Engineers awards 2013

DISCLOSURE OF INVENTION

Technical Problem

The plate-type heat exchanger has an outside dimension of, for example, 95 (width)×325 (length)×81.96 (height) (mm). That is, the plate-type heat exchanger is larger than the outside dimension (80 (width)×106 (length)×43.2 (height) (mm)) of the stacked microchannel heat exchanger having the same heat exchange capability as this plate-type heat exchanger. Thus, the surface area of the plate-type heat exchanger, which is in contact with the surrounding air, is larger. Therefore, the plate-type heat exchanger is susceptible to disturbance. Specifically, in this disturbance, heat in the air moves into the plate-type heat exchanger and heat inside the plate-type heat exchanger moves to the air, for example. Therefore, it is difficult to measure the actual temperature of the working fluid without influence from other factors such as disturbance.

On the other hand, the surface area of the stacked microchannel heat exchanger, which is in contact with the surrounding air, is smaller. Therefore, disturbance, for example, heat movement from the air into the heat exchanger body and heat movement from the inside of the heat exchanger body to the air is reduced in the stacked microchannel heat exchanger. Thus, it is easier for the stacked microchannel heat exchanger to measure the actual temperature of the working fluid in comparison with the plate-type heat exchanger. If it is possible to measure the actual temperature of the working fluid, a stacked microchannel heat exchanger used in an air conditioner, a floor heating system, or the like does not need to consume unnecessary energy for temperature adjustment based on measurement errors when the temperature of the air in a room is adjusted to a set temperature.

However, in the actual stacked microchannel heat exchanger used in the air conditioner, the floor heating system, or the like, the temperature of the working fluid flowing through the outlet/inlet of the heat exchanger body is not directly measured and the surface temperature of the pipe connected to the outlet/inlet of the heat exchanger body is measured as described above. For example, in a case of the microchannel heat exchanger used in the floor heating system or the like, although the temperature of the working fluid (e.g., water) flowing through the inlet is a low temperature, the surface temperature of the pipe which is connected to the inlet and through which the working fluid flows may be measured as being higher than the actual temperature of the working fluid as the result of heat movement to the pipe from the air due to heat conduction of the metal surface. Further, although the temperature of the working fluid flowing through the outlet is a high temperature, the surface temperature of the pipe which is connected to the outlet and through which the working fluid flows may be measured as being lower than the actual temperature of the working fluid as the result of heat movement to the air due to heat conduction of the metal surface. These are the errors due to mounting positions of the temperature sensors (above-mentioned errors 1 to 3).

Further, the stacked microchannel heat exchanger is small, and hence heat is transferred between the outlet pipe and the inlet pipe due to heat conduction of the heat exchanger body. Thus, in some cases, the temperature of one of the outlet pipe and the inlet pipe, which has a lower temperature, is measured as a higher temperature, and the temperature of the other which has a higher temperature is measured as a lower temperature.

As described above, the actual temperatures of the working fluids cannot to measured in accordance with the method for measuring the temperatures of the working fluids by the use of the temperature sensors mounted on the surfaces of the pipes connected to the outlet and inlet of the stacked microchannel heat exchanger.

In view of this, in order to measure actual temperatures of the working fluids flowing through the outlet and inlet of the heat exchanger body, the following method has been considered. This method is a method of directly measuring the temperatures of the working fluids flowing through the outlet and inlet of the heat exchanger body by inserting the sensing points of the temperature sensors (temperature-measuring junctions of thermocouple) into the pipes of the outlet and inlet of the heat exchanger body, to thereby allow the working fluids flowing within the pipes to be in direct contact with the sensing points of the temperature sensors.

However, this method also has a problem in that the actual temperatures of the working fluids cannot be correctly measured even by allowing the sensing points of the temperature sensors to be in direct contact with the working fluids flowing within the pipes. It is because, when the working fluid flows within each pipe, the flow of the working fluid is reduced in velocity near an inner wall of the pipe, and a non-uniform temperature distribution occurs in the working fluid flowing within the pipe.

In view of the above-mentioned circumstances, it is an object of the present invention to provide a heat exchanger capable of correctly measuring the temperatures of the working fluids flowing through the outlet and inlet of the heat exchanger body.

Solution to Problem

In order to accomplish the above-mentioned object, a heat exchanger according to an embodiment of the present invention includes: a heat exchanger body that includes a high-temperature channel through which a high-temperature fluid flows and a low-temperature channel through which a low-temperature fluid flows, and that exchanges heat between the high-temperature fluid flowing through the high-temperature channel and the low-temperature fluid flowing through the low-temperature channel; a high-temperature inlet pipe that is connected to an inlet of the high-temperature channel of the heat exchanger body and allows the high-temperature fluid to flow into the high-temperature channel from an outside; a low-temperature inlet pipe that is connected to an inlet of the low-temperature channel of the heat exchanger body and allows the low-temperature fluid to flow into the low-temperature channel from the outside; a flow adjustment ring that is disposed within at least either one of the high-temperature inlet pipe and the low-temperature inlet pipe and allows the high-temperature fluid or the low-temperature fluid to be mixed; and a temperature sensor provided in such a manner that a sensing point is arranged in a core region formed in a downstream region of the flow adjustment ring.

Further, in the heat exchanger according to the present invention, the flow adjustment ring may include an aperture that allows the high-temperature fluid or the low-temperature fluid to pass therethrough, and an opening diameter of the aperture may be, on an upstream side, equal to an inside diameter of the high-temperature inlet pipe or the low-temperature inlet pipe, and be, on a downstream side, smaller than the opening diameter on the upstream side.

Further, the heat exchanger according to the present invention may be a microchannel heat exchanger.

Advantageous Effects of Invention

In accordance with the present invention, the sensing point of the temperature sensor is arranged in the core region formed in the downstream region of the flow adjustment ring disposed within at least either one of the high-temperature inlet pipe and the low-temperature inlet pipe connected to the inlet of the heat exchanger body. Thus, it is possible to correctly measure the temperatures of the working fluids flowing through the inlet and the outlet of the heat exchanger body.

MODE(S) FOR CARRYING OUT THE INVENTION

Hereinafter, an embodiment of the present invention will be described with reference to the drawings.

<First Embodiment>

Figure 1:
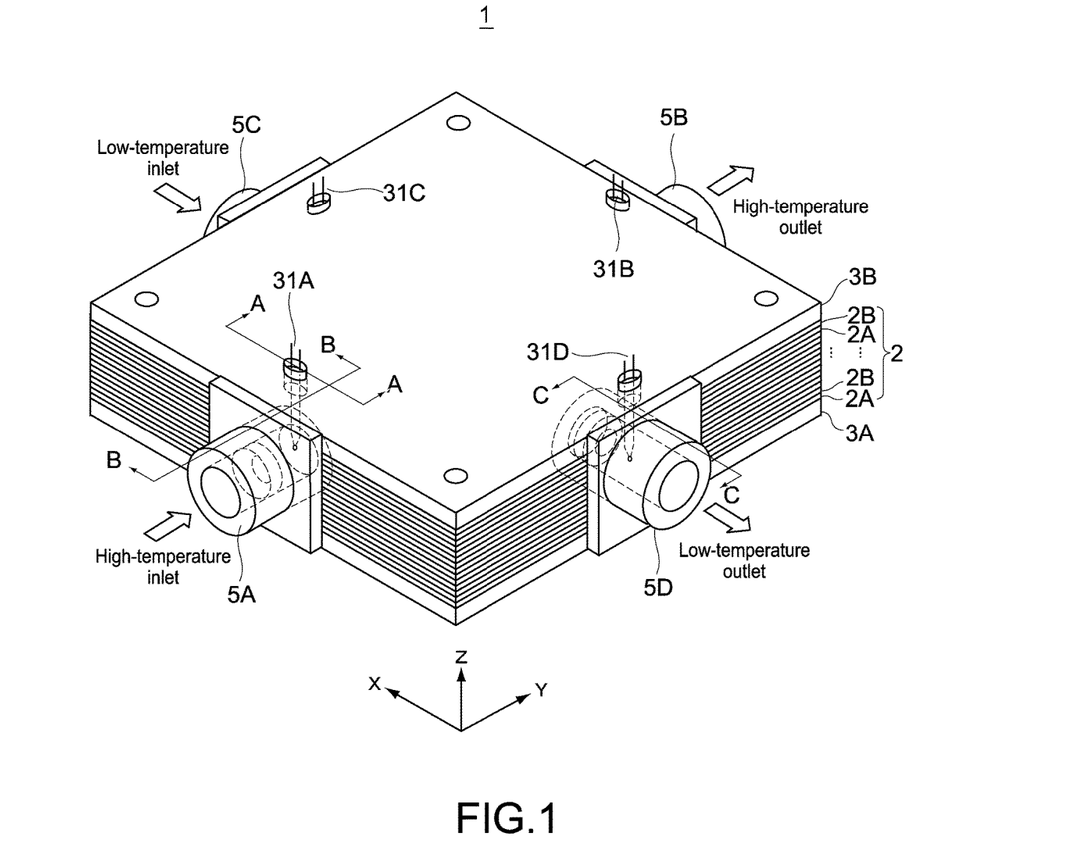
[FIG. 1] A perspective view showing a microchannel heat exchanger according to an embodiment of the present invention.
Figure 2:
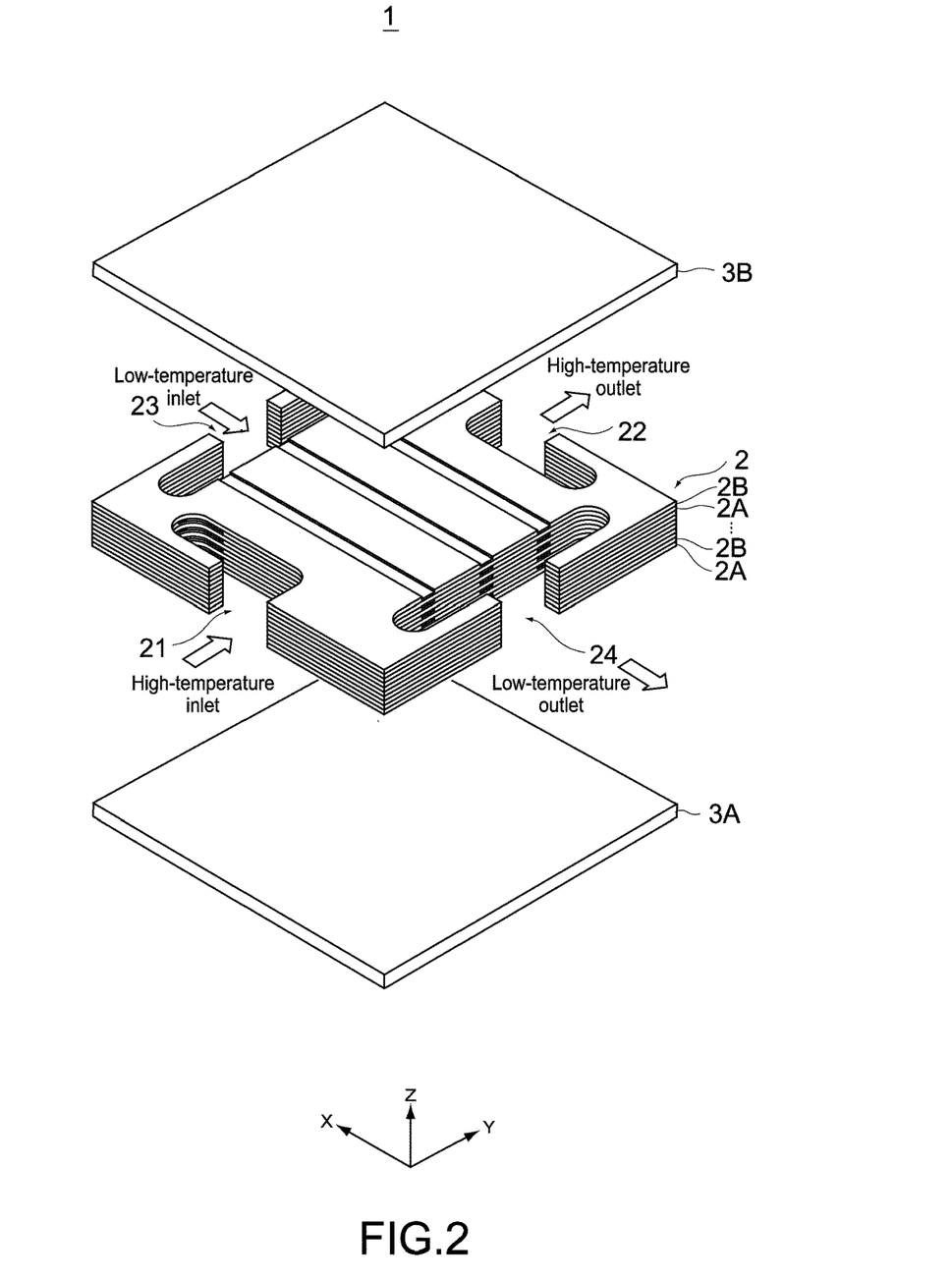
[FIG. 2] A perspective view showing the microchannel heat exchanger of FIG. 1 in a partially exploded state.

FIG. 1 is a perspective view showing a microchannel heat exchanger according to a first embodiment of the present invention. FIG. 2 is a perspective view showing the microchannel heat exchanger of FIG. 1 in a partially exploded state.

[Entire Configuration]

As shown in those figures, this microchannel heat exchanger 1 includes a heat exchanger body 2 that is a stack of channel layers, a high-temperature-side outer case plate 3A, a low-temperature-side outer case plate 3B, a high-temperature inlet pipe 5A that allows a high-temperature fluid to flow in, a high-temperature outlet pipe 5B that allows the high-temperature fluid to flow out, a low-temperature inlet pipe 5C that allows a low-temperature fluid to flow in, and a low-temperature outlet pipe 5D that allows the low-temperature fluid to flow out. Note that, hereinafter, the high-temperature inlet pipe 5A, the high-temperature outlet pipe 5B, the low-temperature inlet pipe 5C, and the low-temperature outlet pipe 5D will be collectively referred to as outlet/inlet pipes.

A surface of the heat exchanger body 2, which is in a direction opposite to a direction of an arrow of a Z-axis in the figure, will be referred to as a "surface on a high-temperature side" or a "lower surface". A surface of each member, which is in the direction of the arrow of the Z-axis, will be referred to as a "surface of a low-temperature side" or an "upper surface". The high-temperature-side outer case plate 3A is bonded to the surface on the high-temperature side of the heat exchanger body 2 is bonded and the low-temperature-side outer case plate 3B is bonded to the surface of the low-temperature side of the heat exchanger body 2.

The heat exchanger body 2 is formed by alternately stacking two types of heat transfer plates 2A, 2B each including a plurality of heat transfer plates. Configurations of the two types of heat transfer plates will be described later.

The two types of heat transfer plates 2A, 2B, the high-temperature-side outer case plate 3A, and the low-temperature-side outer case plate 3B that form the heat exchanger body 2 are formed of the same kind of metal plates having high heat conductivity, for example. More specifically, stainless steel or the like is used. These metal plates are stacked and then bonded to each other by diffusion welding to become an approximately rectangular paralleled-shaped stack. Note that the heat transfer plates 2A, 2B can have any plate thickness as long as the heat transfer plates 2A, 2B can form high-temperature channels or low-temperature channels and be diffusion-welded.

Hereinafter, surfaces of the microchannel heat exchanger 1, which are perpendicular to the Z-axis, will be referred to as "main surfaces" and four surfaces other than the main surfaces, which are perpendicular to the X-axis and the Y-axis, will be referred to as "side surfaces" in a manner that depends on needs for description.

As shown in FIG. 2, a high-temperature inlet header 21, a high-temperature outlet header 22, a low-temperature inlet header 23, and a low-temperature outlet header 24 are formed in the side surfaces of the microchannel heat exchanger 1, respectively. The high-temperature inlet header 21 allows a high-temperature fluid that is one of working fluids to flow into the high-temperature channels within the heat exchanger body 2. The high-temperature outlet header 22 allows the high-temperature fluid to flow out of the high-temperature channels within the heat exchanger body 2. The low-temperature inlet header 23 allows a low-temperature fluid that is another one of the working fluids to flow into the low-temperature channels within the heat exchanger body 2. The low-temperature outlet header 24 allows the low-temperature fluid to flow out of the low-temperature channels within the heat exchanger body 2.

As shown in FIG. 1, the high-temperature inlet pipe 5A is inserted into the high-temperature inlet header 21 from an outside and bonded to the heat exchanger body 2 by welding or the like. To an outer end portion of this high-temperature inlet pipe 5A, an outside pipe (not shown) for allowing the high-temperature fluid to flow in is detachably connected.

The high-temperature outlet pipe 5B is inserted into the high-temperature outlet header 22 from the outside and bonded to the heat exchanger body 2 by welding or the like. To this high-temperature outlet pipe 5B, an outside pipe (not shown) for allowing the high-temperature fluid to flow out is detachably connected. The low-temperature inlet pipe 5C is inserted into the low-temperature inlet header 23 from the outside and bonded to the heat exchanger body 2 by welding or the like. To this low-temperature inlet pipe 5C, an outside pipe (not shown) for allowing the low-temperature fluid to flow in is detachably connected. The low-temperature outlet pipe 5D is inserted into the low-temperature outlet header 24 from the outside and bonded to the heat exchanger body 2 by welding or the like. To this low-temperature outlet pipe 5D, an outside pipe (not shown) for allowing the low-temperature fluid to flow out is detachably connected.

[Configuration of Heat Exchanger Body 2]

Next, a configuration of the heat exchanger body 2 will be described.

As described above, the heat exchanger body 2 is formed by alternately stacking two types of heat transfer plates 2A, 2B, each including a plurality of heat transfer plates. Channels and cutouts are formed in these heat transfer plates 2A, 2B by etching. The fluids flowing into the channels are different between the heat transfer plates 2A, 2B. Therefore, the channels have different patterns. Meanwhile, the cutouts are formed to be header portions after the heat transfer plates 2A and 2B are stacked. Therefore, the cutouts have an identical shape. Note that processing for forming the channels and the cutouts in the heat transfer plates 2A and 2B includes not only etching but also laser beam machining, precision press processing, and cutting, for example. Further, edges of the channels may be formed by using an additive manufacturing technology such as a 3D printer.

Figure 3:
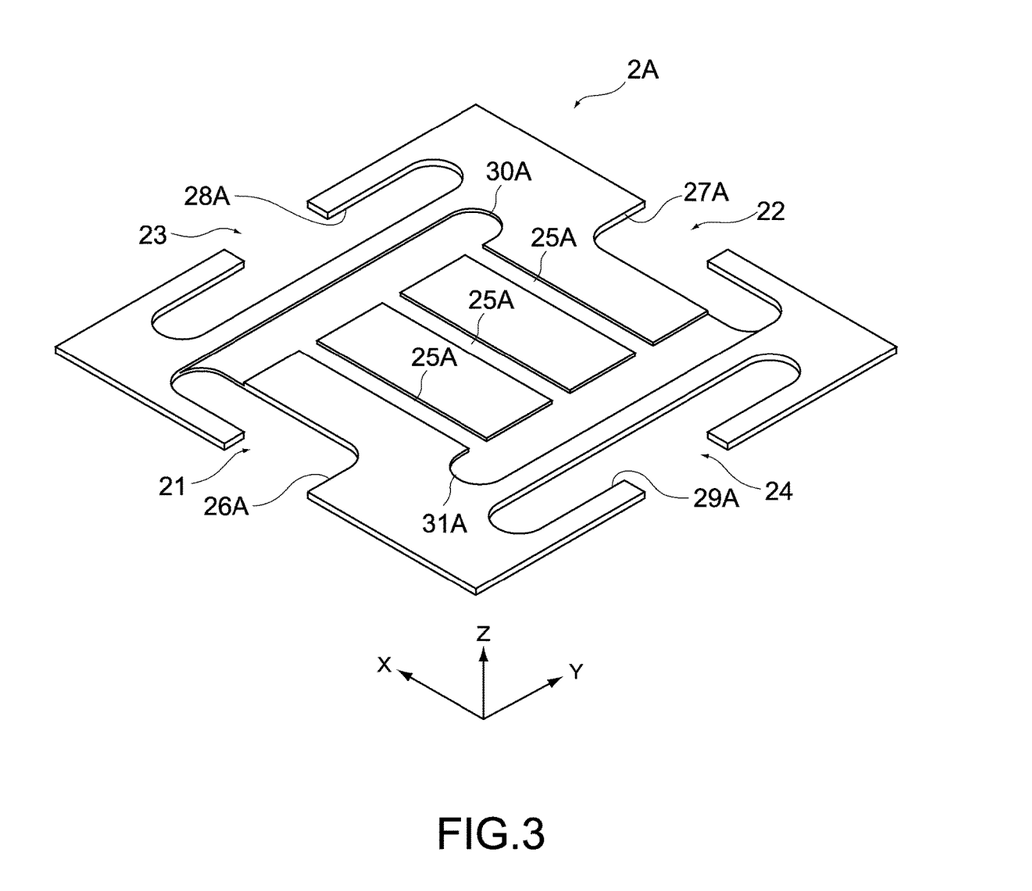
[FIG. 3] A configuration of a perspective view showing a high-temperature heat transfer plate in the microchannel heat exchanger of FIG. 1.
Figure 4:
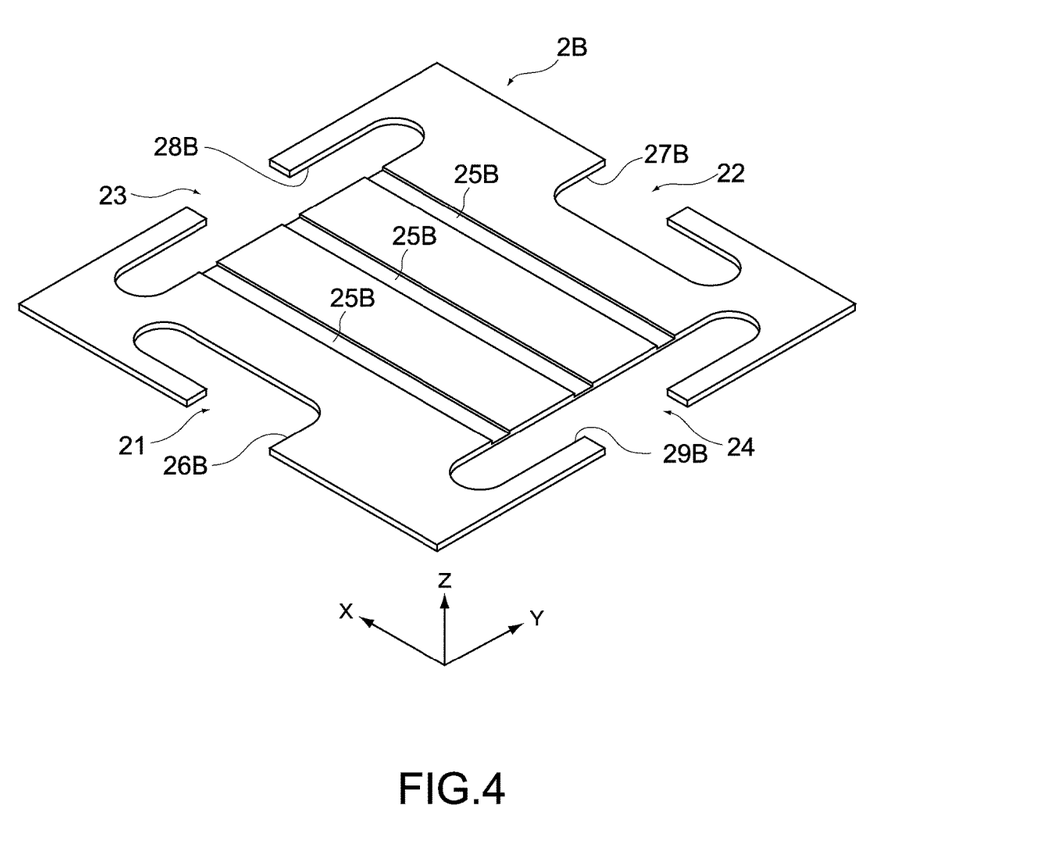
[FIG. 4] A configuration of a perspective view showing a low-temperature heat transfer plate in the microchannel heat exchanger of FIG. 1.

FIGS. 3 and 4 are perspective views showing the two types of heat transfer plates 2A, 2B. Here, the heat transfer plate 2A shown in FIG. 3 is a "high-temperature heat transfer plate 2A", and the heat transfer plate 2B shown in FIG. 4 is a "low-temperature heat transfer plate 2B".

(Configuration of High-Temperature Heat Transfer Plate 2A)

As shown in FIG. 3, the high-temperature heat transfer plate 2A is provided with each of channels 25A, 30A, 31A and cutouts 26A, 27A, 28A, 29A that form channels of the high-temperature fluid. The channels 25A, 30A, 31A are provided only in one surface of the high-temperature heat transfer plate 2A. The depth of the channels 25A, 30A, 31A may be equal at any points. The cutouts 26A, 27A, 28A, 29A are formed by removing predetermined sites respectively corresponding to four sides of a base material of the high-temperature heat transfer plate 2A by an amount corresponding to the thickness of the base material.

Hereinafter, the cutouts 26A, 27A, 28A, 29A of the high-temperature heat transfer plate 2A will be respectively referred to as a first cutout 26A (high-temperature distribution portion), a second cutout 27A (high-temperature merging portion), a third cutout 28A, and a fourth cutout 29A in a manner that depends on needs for description.

The plurality of channels 25A, 30A, 31A that communicate between these first cutout 26A and second cutout 27A are formed in a region between the first cutout 26A and the second cutout 27A provided at both end portions of the high-temperature heat transfer plate 2A in a Y-axis direction in the figure. Note that, although the number of channels 25A is three in FIG. 3, a larger number of channels smaller in width may be formed.

Each of the above-mentioned channels 25A, 30A, 31A of the high-temperature heat transfer plate 2A includes the plurality of channels 25A formed along an X-axis direction and the two channels 30A, 31A formed along the Y-axis direction. The one channel 30A of the two channels 30A, 31A formed along the Y-axis direction communicates with the first cutout 26A at an end thereof. The other channel 31A communicates with the second cutout 27A at an end thereof. The plurality of channels 25A formed along the X-axis direction each communicate between the two channels 30A, 31A. With this, regarding a positional relationship between the high-temperature inlet header 21 and high-temperature outlet header 22 of the high-temperature heat transfer plate 2A and the low-temperature inlet header 23 and low-temperature outlet header 24 of the low-temperature heat transfer plate 2B, which are formed as will be described later, they are different from each other by 90 degrees.

(Configuration of Low-Temperature Heat Transfer Plate 2B)

As shown in FIG. 4, the low-temperature heat transfer plate 2B is provided with channels 25B and cutouts 26B, 27B, 28B, 29B that form channels of the low-temperature fluid. The channels 25B are provided only in one surface of the low-temperature heat transfer plate 2B. The depth of the channels 25B may be equal at any points. The cutouts 26B, 27B, 28B, 29B are formed by removing predetermined sites respectively corresponding to four sides of a base material of the low-temperature heat transfer plate 2B by an amount corresponding to the thickness of the base material.

Hereinafter, the cutouts 26B, 27B, 28B, 29B of the low-temperature heat transfer plate 2B will be respectively referred to as a fifth cutout 26B, a sixth cutout 27B, a seventh cutout 28B (low-temperature distribution portion), and an eighth cutout 29B (low-temperature merging portion) in a manner that depends on needs for description.

In a region between the seventh cutout 28B and the eighth cutout 29B provided at both end portions of the low-temperature heat transfer plate 2B in the X-axis direction in the figure, the plurality of channels 25B that communicate between these seventh cutout 28B and eighth cutout 29B are formed. The plurality of channels 25B are formed at the same positions in the Y-axis direction as the plurality of channels 25A formed in the high-temperature heat transfer plate 2A, respectively.

(Stacked Structure of High-Temperature Heat Transfer Plate 2A and Low-Temperature Heat Transfer Plate 2B)

Figure 5:
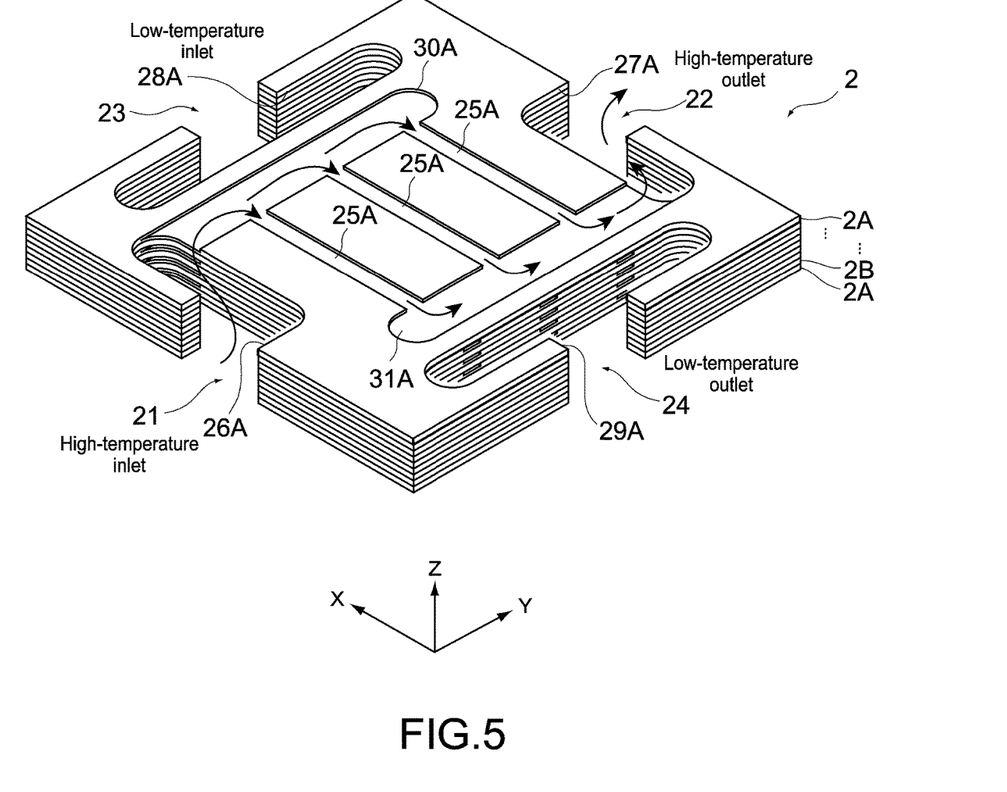
[FIG. 5] A perspective view for describing high-temperature channels of a high-temperature channel layer in the microchannel heat exchanger of FIG. 1.
Figure 6:
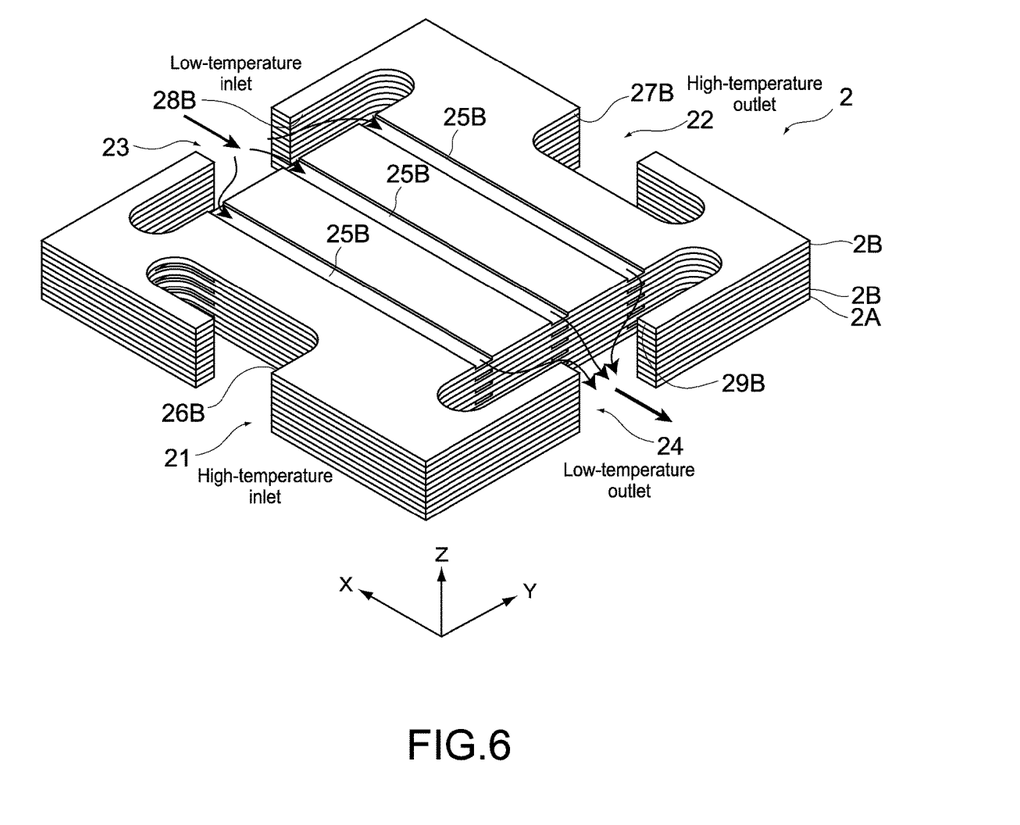
[FIG. 6] A perspective view for describing low-temperature channels of a low-temperature channel layer in the microchannel heat exchanger of FIG. 1.

A plurality of high-temperature heat transfer plates 2A and a plurality of low-temperature heat transfer plates 2B having configurations as described above are alternately superimposed and stacked with the surfaces provided with the channels 25A, 25B, 30A, 31A of both are oriented in the same direction as shown in FIGS. 5 and 6. In this manner, the heat exchanger body 2 is formed.

In this heat exchanger body 2, the first cutout 26A of the high-temperature heat transfer plate 2A and the fifth cutout 26B of the low-temperature heat transfer plate 2B are form the high-temperature inlet header 21 in such a manner that the plurality of high-temperature heat transfer plates 2A and the plurality of low-temperature heat transfer plates 2B are alternately stacked.

The second cutout 27A of the high-temperature heat transfer plate 2A and the sixth cutout 27B of the low-temperature heat transfer plate 2B form the high-temperature outlet header 22 in such a manner that the plurality of high-temperature heat transfer plates 2A and the plurality of low-temperature heat transfer plates 2B are alternately stacked.

The third cutout 28A of the high-temperature heat transfer plate 2A and the seventh cutout 28B of the low-temperature heat transfer plate 2B form the low-temperature inlet header 23 in such a manner that the plurality of high-temperature heat transfer plates 2A and the plurality of low-temperature heat transfer plates 2B are alternately stacked.

The fourth cutout 29A of the high-temperature heat transfer plate 2A and the eighth cutout 29B of the low-temperature heat transfer plate 2B form the low-temperature outlet header 24 in such a manner that the plurality of high-temperature heat transfer plates 2A and the plurality of low-temperature heat transfer plates 2B are alternately stacked.

(Regarding High-Temperature Channels and Low-Temperature Channels)

FIG. 5 is a perspective view showing the high-temperature channels in the heat exchanger body 2.

The high-temperature channels are formed between the respective channels 25A, 30A, 31A of the high-temperature heat transfer plate 2A and a lower surface of the low-temperature heat transfer plate 2B. The high-temperature fluid flows in from the high-temperature inlet header 21 and is distributed into the plurality of channels 25A through the channel 30A. The high-temperature fluid passing through the plurality of channels 25A merges in the channel 31A, and flows out through the high-temperature outlet header 22. Such a flow of the high-temperature fluid occurs in a high-temperature channel layer corresponding to each of the high-temperature heat transfer plates 2A. Note that the high-temperature channel layer is formed by the respective channels 25A, 30A, 31A, the first cutout 26A, and the second cutout 27A of the high-temperature heat transfer plate 2A.

FIG. 6 is a perspective view showing the low-temperature channels in the heat exchanger body 2.

The low-temperature channels are formed between the channels 25B of the low-temperature heat transfer plate 2B and each of a lower surface of the low-temperature-side outer case plate 3B and a lower surface of the high-temperature heat transfer plate 2A. The low-temperature fluid flows in from the low-temperature inlet header 23, and flows out of the low-temperature outlet header 24 through the plurality of channels 25B. Such a flow of the low-temperature fluid occurs in a low-temperature channel layer corresponding to each of the low-temperature heat transfer plates 2B. Note that the low-temperature channel layer is formed of each of the channels 25B, the seventh cutout 28B, and the eighth cutout 29B of the low-temperature heat transfer plate 2B.

The high-temperature channel layers and the low-temperature channel layers are alternately stacked in the heat exchanger body 2. Therefore, heat is exchanged between the high-temperature fluid and the low-temperature fluid via the high-temperature heat transfer plate 2A and the low-temperature heat transfer plate 2B.

[Detection Structure of Fluid Temperature of Outlet/Inlet of Heat Exchanger Body]

The microchannel heat exchanger 1 of this embodiment employs the following configuration in order to make it possible to directly measure temperatures of the high-temperature fluid and the low-temperature fluid flowing through the inlet and the outlet of the heat exchanger body 2.

As shown in FIG. 1, in the heat exchanger body 2, there are provided a first temperature sensor 31A, a second temperature sensor 31B, a third temperature sensor 31C, and a fourth temperature sensor 31D. The first temperature sensor 31A measures the temperature of the high-temperature fluid flowing through the high-temperature inlet pipe 5A inserted into the high-temperature inlet header 21. The second temperature sensor 31B measures the temperature of the high-temperature fluid flowing through the high-temperature outlet pipe 5B inserted into the high-temperature outlet header 22. The third temperature sensor 31C measures the temperature of the low-temperature fluid flowing through the low-temperature inlet pipe 5C inserted into the low-temperature inlet header 23. The fourth temperature sensor 31D measures the temperature of the low-temperature fluid flowing through the low-temperature outlet pipe 5D inserted into the low-temperature outlet header 24.

Figure 7:
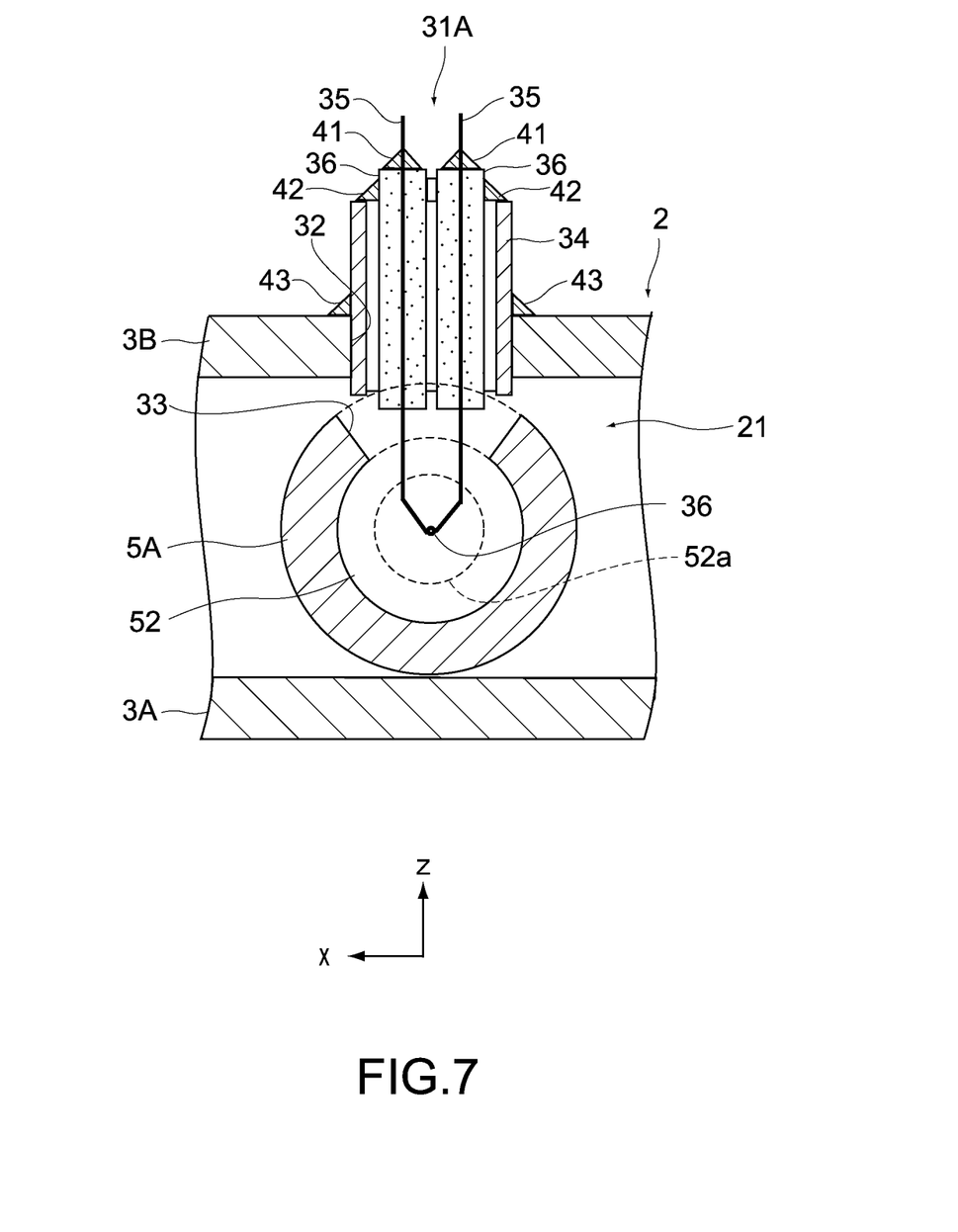
[FIG. 7] A cross-sectional view taken along the line A-A in FIG. 1.
Figure 8:
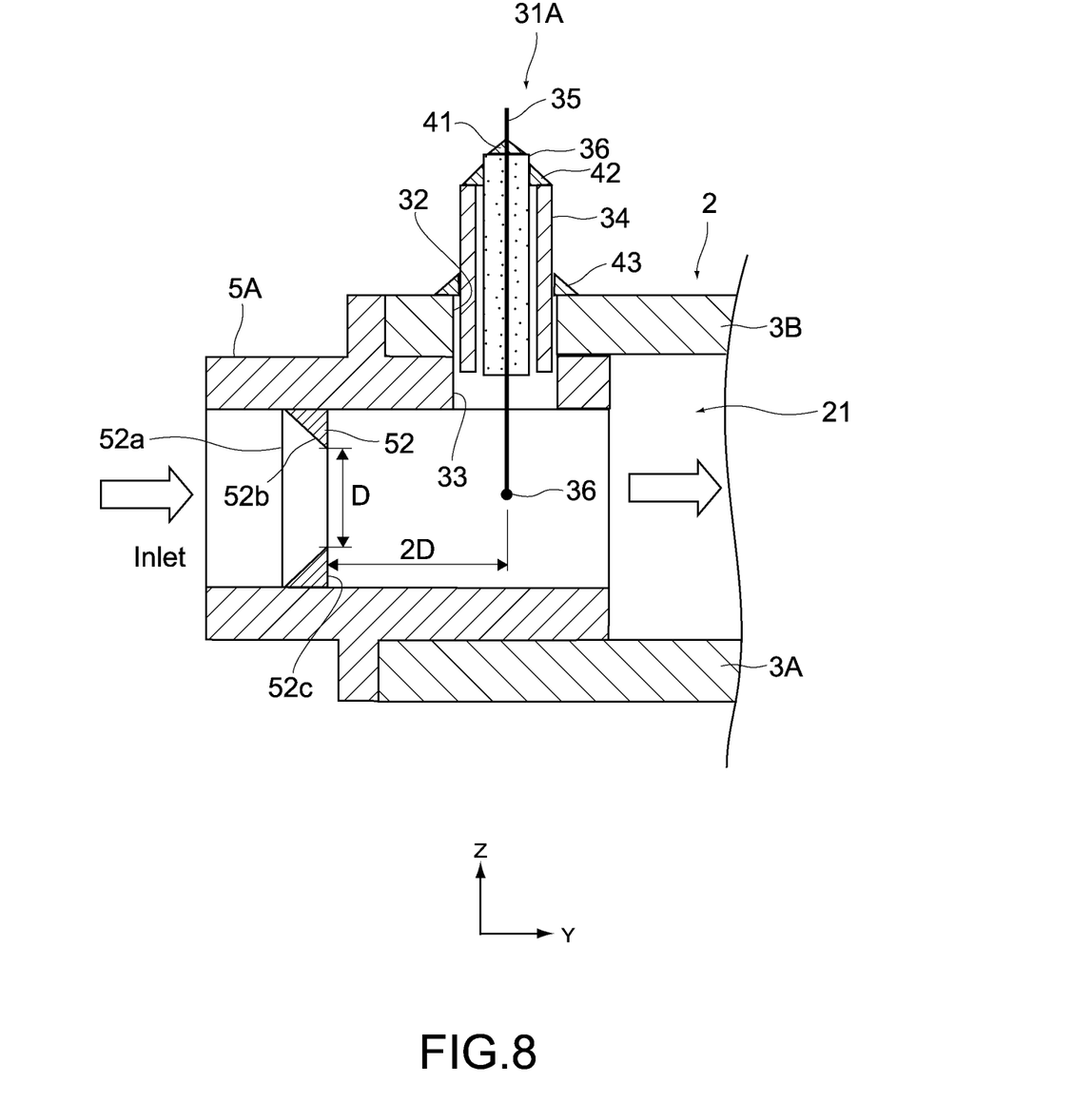
[FIG. 8] A cross-sectional view taken along the line B-B in FIG. 1.

FIGS. 7 and 8 are cross-sectional views of the heat exchanger body 2, which are taken along the cutting line A-A and the cutting line B-B shown in FIG. 1, showing an attachment structure of the first temperature sensor 31A. FIG. 7 is an X-Z cross-sectional view as the attachment structure of the temperature sensor 31A is viewed in an axis direction of the high-temperature inlet pipe 5A (flow direction of fluid). FIG. 8 is a Y-Z cross-sectional view thereof. Attachment structures of the other temperature sensors 31B, 31C, 31D are similar to the attachment structure of the first temperature sensor 31A, and hence only the attachment structure of the first temperature sensor 31A will be described here.

A hole 32 is provided in the low-temperature-side outer case plate 3B of the heat exchanger body 2. The hole 32 is for inserting a thermocouple that is the first temperature sensor 31A into the heat exchanger body 2. A hole 33 is provided in a site of the high-temperature inlet pipe 5A inserted into the inlet of the heat exchanger body 2, the site being on the side of the low-temperature-side outer case plate 3B. The hole 33 communicates with the hole 32 of the low-temperature-side outer case plate 3B. In each of the holes 32, 33 of the low-temperature-side outer case plate 3B and the high-temperature inlet pipe 5A, a metal protection pipe 34 made of, for example, stainless steel is arranged. The lead wires 35, 35 of the first temperature sensor 31A are covered with electrical insulation/thermal insulation members 36, and retained within the metal protection pipe 34. One having diameter of approximately 0.5 mm to 1 mm, for example, can be used as each of the lead wires 35, 35 of the first temperature sensor 31A. It is desirably increased in durability with a ceramic thin film or the like. Temperature-measuring junctions 36 (sensing points of the temperature sensor), which are provided at leading ends of the lead wires 35, 35 of the first temperature sensor 31A, are arranged to be in direct contact with a fluid flowing in the high-temperature inlet pipe 5A. It is desirable that the temperature-measuring junctions 36 have a spherical shape having a diameter of approximately 0.5 mm or 1 mm, for example, not to receive pressure from the fluid as much as possible.

The lead wires 35, 35 of the first temperature sensor 31A are protruded above an upper end of the metal protection pipe 34 for electrical connection with the outside. At upper surfaces of the electrical insulation/thermal insulation layers 36 from which the lead wires 35, 35 of the first temperature sensor 31A are protruded, clearances from the electrical insulation/thermal insulation layers 36 in outer peripheries of the lead wires 35, 35 are closed by seal materials 41. Further, at the upper end of the metal protection pipe 34, clearances between the electrical insulation/thermal insulation layers 36 and the metal protection pipe 34 are closed by other seal materials 42. In addition, clearances between the hole 32 of the high-temperature-side outer case plate 3A and the metal protection pipe 34 are also closed by other seal materials 43.

These seal materials 41, 42, 43 are selected in a manner that depends on the pressure of the working fluid.

For example, if the pressure of the working fluid is equal to or lower than 0.5 MP, an adhesive seal can be used. If the pressure of the working fluid is equal to or lower than 2 MP, a strip-shaped seal tape is desirably used. If the pressure of the working fluid is equal to or lower than 6.5 MP, a circular seal washer having a hole is desirably used.

Hereinabove, the attachment structure of the first temperature sensor 31A has been described. The attachment structures of the second temperature sensor 31B, the third temperature sensor 31C, and the fourth temperature sensor 31D are similar to the attachment structure of the first temperature sensor 31A.

As described above, the temperature-measuring junctions 36 of the first temperature sensor 31A are held in direct contact with the high-temperature fluid flowing in the high-temperature inlet pipe 5A. In this manner, the temperature of the high-temperature fluid that flows in the heat exchanger body 2 can be directly measured. Similarly, the temperatures of the high-temperature fluid that flows out of the heat exchanger body 2, the low-temperature fluid that flows into the heat exchanger body 2, and the low-temperature fluid that flows out of the heat exchanger body 2 can be directly measured by the second temperature sensor 31B, the third temperature sensor 31C, and the fourth temperature sensor 31D, respectively.

However, the working fluid flowing within each of the outlet/inlet pipes 5A, 5B, 5C, 5D is reduced in velocity near the inner wall of each of the outlet/inlet pipes 5A, 5B, 5C, 5D, and a non-uniform temperature distribution is thus formed. Therefore, even when the temperature of the working fluid is directly measured, an accurate temperature cannot necessarily be obtained as the result of measurement.

In view of this, in this embodiment, a flow adjustment ring is disposed within each of the outlet/inlet pipes 5A, 5B, 5C, 5D of the outlet/inlet of the heat exchanger body 2. The flow adjustment ring is for forming a core region in which the velocity and the temperature of the working fluid becomes approximately constant. The temperature-measuring junctions of the temperature sensor are arranged in the core region formed in a downstream region of this flow adjustment ring.

As shown in FIGS. 7 and 8, a flow adjustment ring 52 is disposed within the high-temperature inlet pipe 5A. The flow adjustment ring 52 includes an aperture 52a coaxially with respect to the high-temperature inlet pipe 5A. A diameter D on an inlet side of this aperture 52a is equal to an inside diameter of the high-temperature inlet pipe 5A. The diameter D on an outlet side is about two-thirds of the diameter D on the inlet side. Then, a portion between the inlet side and the outlet side of the aperture 52a has a mortar-like taper surface shape. This structure is also applied to the low-temperature inlet pipe 5C connected to the inlet of the heat exchanger body 2, into which the low-temperature fluid flows.

Figure 9:
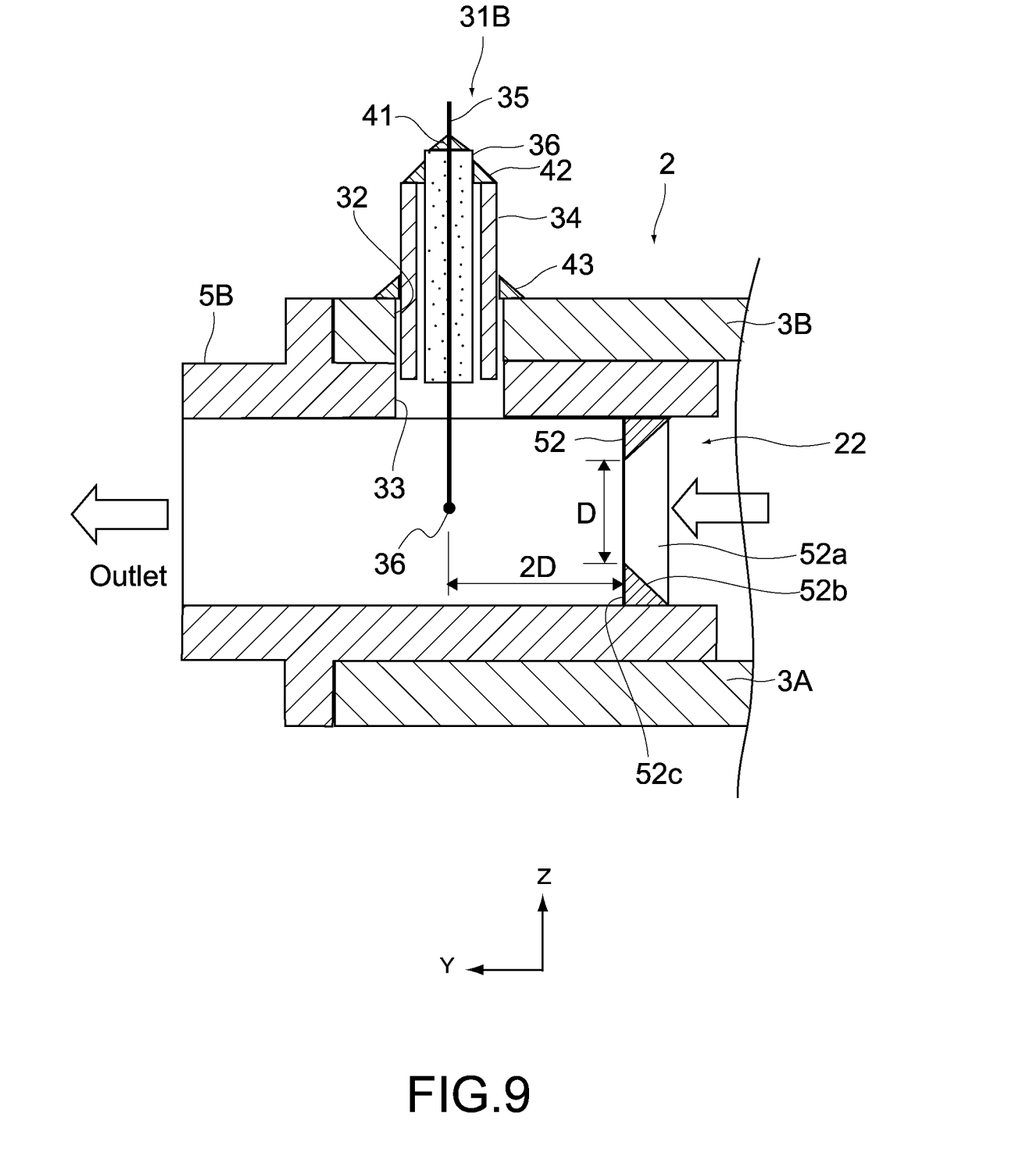
[FIG. 9] A cross-sectional view taken along the line C-C in FIG. 1.

FIG. 9 is a Y-Z cross-sectional view taken along the cutting line C-C shown in FIG. 1, showing the high-temperature outlet pipe 5B connected to the outlet of the heat exchanger body 2, of which the high-temperature fluid flows out, and the flow adjustment ring 52.

As shown in the figure, the flow adjustment ring 52 is also disposed within the high-temperature outlet pipe 5B connected to the outlet of the heat exchanger body 2, of which the high-temperature fluid flows out.

This structure is also applied to the low-temperature outlet pipe 5D connected to the outlet of the heat exchanger body 2, of which the low-temperature fluid flows out.

Figure 10:
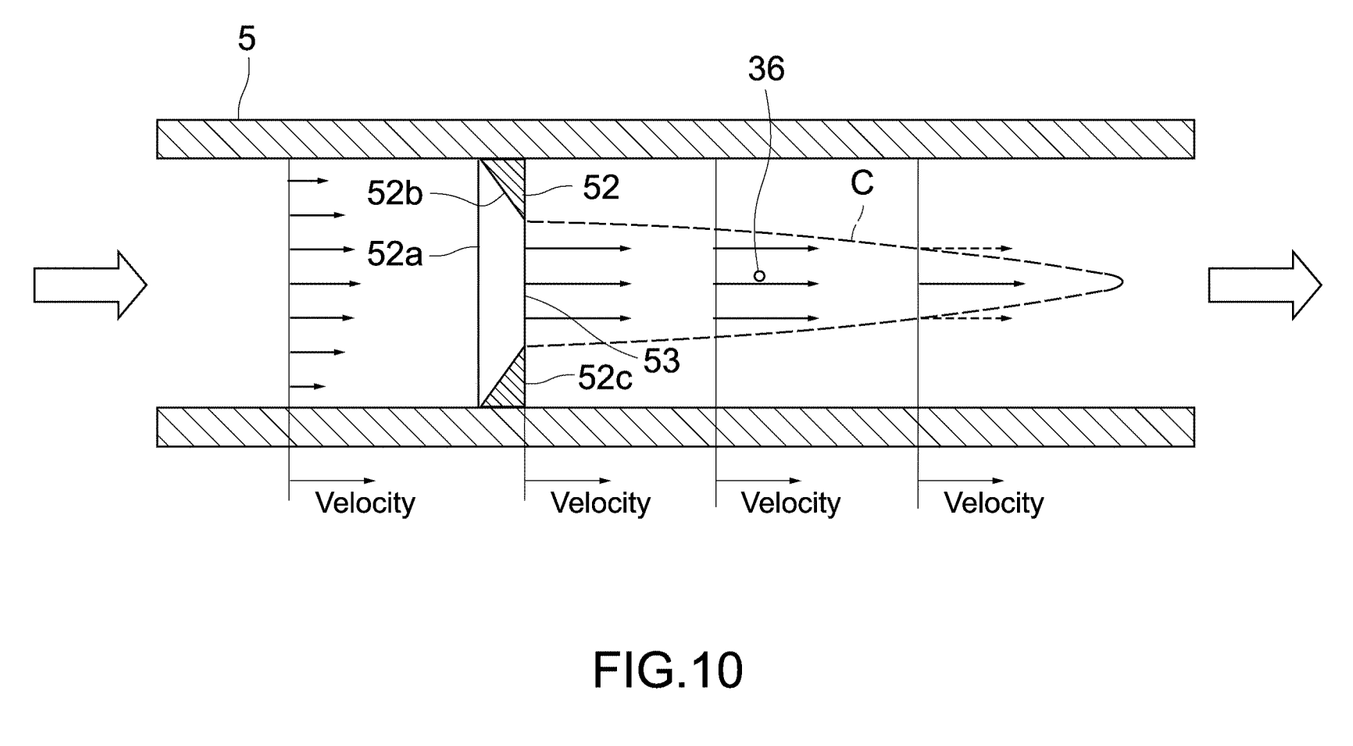
[FIG. 10] A diagram showing a velocity distribution of a working fluid in an upstream region and a downstream region of a flow adjustment ring, regarding the microchannel heat exchanger of FIG. 1.

FIG. 10 is a diagram showing a velocity distribution of the working fluid in an upstream region and a downstream region of the flow adjustment ring 52. In a case where the flow adjustment ring 52 is provided in the inlet pipe, an outlet side 52c of the aperture 52a becomes a boundary 53 with the inlet of the heat exchanger body 2.

The working fluid flowing into each of the outlet/inlet pipes 5A, 5B, 5C, 5D from the outside or the heat exchanger body 2 is reduced in velocity near the inner wall of each of the outlet/inlet pipes 5A, 5B, 5C, 5D in the upstream region of the flow adjustment ring 52. As a result, a non-uniform velocity distribution occurs. Specifically, in this non-uniform velocity distribution, the velocity decreases as the distance from the center axis of each of the outlet/inlet pipes 5A, 5B, 5C, 5D increases. In the upstream region of the flow adjustment ring 52, the working fluid flowing near the inner wall of each of the outlet/inlet pipes 5A, 5B, 5C, 5D is guided in a direction to the center axis of each of the outlet/inlet pipes 5A, 5B, 5C, 5D by a taper surface 52b of the aperture 52a of the flow adjustment ring 52, and mixed into other flows passing near a center of the aperture 52a of the flow adjustment ring 52. As a result, a core region C is generated in the downstream region just behind the outlet side 52c of the aperture 52a of the flow adjustment ring 52. In this core region C, the velocity of the working fluid is approximately constant and higher than an average velocity of the working fluid within the outlet/inlet pipe 5A, 5B, 5C, 5D in the upstream region of the flow adjustment ring 52. Assuming that the diameter on the inlet side of the flow adjustment ring 52 is D and the diameter on the outlet side is 2/3 D as an example, the core region C is formed between the outlet side 52c of the aperture 52a of the flow adjustment ring 52 and a position spaced away from the outlet side 52c by 6 D downstream (approximately uniform temperature distribution region can be formed both radially and axially, and hence mounting of the thermocouple is facilitated and also fluid temperature measurement becomes correct). There are a velocity boundary layer and a temperature boundary layer outside the core region C. In this core region C, the velocity of the working fluid is approximately constant and also temperature distribution is approximately uniform. Therefore, by arranging the temperature-measuring junctions 36 of the temperature sensor in this core region C, the temperature of the working fluid can be correctly measured without being influenced by the velocity boundary layer and the temperature boundary layer.

In this embodiment, as shown in FIGS. 8 and 9, the temperature sensors 31A, 31B are arranged in such a manner that the temperature-measuring junctions 36 are located at positions spaced away from the position of the outlet side 52c of the aperture 52a of the flow adjustment ring 52 by a distance of 2 D on the downstream side. With this, the temperature of the working fluid that flows in or flows out of the inlet or the outlet of the heat exchanger body 2 can be correctly measured without being influenced by the velocity boundary layer and the temperature boundary layer. With this, calculation of the quantity of heat of heat exchange, control of the flowing-out working fluid to a desired temperature, and the like can be more correctly performed.

Note that, regarding the shape of the aperture 52a of the flow adjustment ring 52, the taper surface 52b of the aperture 52a may be a constant tilt surface in a cross-section, though the present invention is not limited thereto. It is only necessary to gradually narrow the area of the aperture 52a, and hence it may be a sine-curve surface, a paraboloid surface, or hyperboloid surface.

Further, in this embodiment, two working fluids flowing within the heat exchanger body 2 are parallel flows. However, if they need to be counter flows, the temperature-measuring junctions of the temperature sensor can be arranged within the core region C formed by the flow adjustment ring, by exchanging the inlet pipes and the outlet pipes. Alternatively, the two working fluids may be changed into orthogonal flows by changing the pattern of the channels of the high-temperature heat transfer plate 2A and the low-temperature heat transfer plate 2B.

In addition, in this embodiment, in order to measure the temperatures of the working fluids flowing through the inlets of the heat exchanger body 2, the temperature-measuring junctions 36 of the temperature sensors 31A, 31B are arranged within the inlet pipes 5A, 5C, though the present invention is not limited thereto. The temperature-measuring junctions 36 of the temperature sensors 31A, 31B may be arranged within the inlets of the headers 21, 23 of the heat exchanger body 2. Further, in this embodiment, the flow adjustment rings are provided in all the outlet/inlet pipes 5A, 5B, 5C, 5D, though the present invention is not limited thereto. The flow adjustment rings may be provided only in the inlet pipes or only in the outlet pipes.

Hereinabove, the embodiment in the case where the present invention is applied to the stacked microchannel heat exchanger has been described. However, the present invention can also be applied to another type of the heat exchanger such as a plate-type heat exchanger.

In addition, the present technology is not limited to the above-mentioned embodiment, and various changes can be made without departing from the gist of the present technology as a matter of course.

REFERENCE SIGNS LIST

C . . . core region
1 . . . microchannel heat exchanger
2 . . . heat exchanger body
2A . . . high-temperature heat transfer plate
2B . . . low-temperature heat transfer plate
3A . . . high-temperature-side outer case plate
3B . . . low-temperature-side outer case plate
5A . . . high-temperature inlet connection pipe
5B . . . high-temperature outlet connection pipe
5C . . . low-temperature inlet connection pipe
5D . . . low-temperature outlet connection pipe
21 . . . high-temperature inlet header
22 . . . high-temperature outlet header
23 . . . low-temperature inlet header
24 . . . low-temperature outlet header
31A . . . first temperature sensor
31B . . . second temperature sensor
31C . . . third temperature sensor
31D . . . fourth temperature sensor
36 . . . temperature-measuring junction
52 . . . flow adjustment ring

The invention claimed is:

1. A heat exchanger, comprising:
a heat exchanger body that includes a high-temperature channel through which a high-temperature fluid flows and a low-temperature channel through which a low-temperature fluid flows, and that exchanges heat between the high-temperature fluid flowing through the high-temperature channel and the low-temperature fluid flowing through the low-temperature channel;
a high-temperature inlet pipe that is connected to an inlet of the high-temperature channel of the heat exchanger body and allows the high-temperature fluid to flow into the high-temperature channel from an outside;
a low-temperature inlet pipe that is connected to an inlet of the low-temperature channel of the heat exchanger body and allows the low-temperature fluid to flow into the low-temperature channel from the outside;
a flow adjustment ring that is disposed within at least either one of the high-temperature inlet pipe and the low-temperature inlet pipe and allows the high-temperature fluid or the low-temperature fluid to be mixed; and
a temperature sensor provided in such a manner that a sensing point is arranged in a core region formed in a downstream region of the flow adjustment ring, wherein
the flow adjustment ring includes an aperture that allows the high-temperature fluid or the low-temperature fluid to pass therethrough, and
an opening diameter of the aperture is, on an upstream side, equal to an inside diameter of the high-temperature inlet pipe or the low-temperature inlet pipe, and is, on a downstream side, smaller than the opening diameter on the upstream side.

2. A heat exchanger wherein the heat exchanger according to claim 1 is a microchannel heat exchanger.

* * * * *